May 30, 1967 — F. HEDERHORST — 3,322,745
POLYMER RECOVERY METHOD
Filed June 28, 1965 — 2 Sheets-Sheet 1

INVENTOR.
FRED HEDERHORST,
BY
ATTORNEY.

May 30, 1967  F. HEDERHORST  3,322,745
POLYMER RECOVERY METHOD
Filed June 28, 1965  2 Sheets-Sheet 2

INVENTOR.
FRED HEDERHORST,
BY
ATTORNEY.

3,322,745
POLYMER RECOVERY METHOD
Fred Hederhorst, Baytown, Tex., assignor to Esso Research and Engineering Company
Filed June 28, 1965, Ser. No. 467,547
31 Claims. (Cl. 260—93.7)

This application is a continuation-in-part of Ser. No. 158,062, filed Dec. 8, 1961, now abandoned.

This invention relates to the recovery of solids from a liquid stream. More particularly, this invention is directed to a method for recovering solids from a slurry containing dissolved solids or containing both dissolved and suspended solids in a solvent. In its most specific aspect, the present invention relates to the recovery of polymers, such as polypropylene, from a slurry containing both suspended and dissolved polymers in a solvent.

The present invention is carried out in an elongated precipitation zone having an antisolvent inlet end and a fluid outlet end. A liquid stream of an antisolvent is continuously introduced at the antisolvent inlet end and is continuously passed through said precipitation zone. A liquid stream containing a dissolved solid is introduced into the precipitation zone intermediate said antisolvent inlet end and said fluid outlet end of the zone. Upon contact with the antisolvent stream, a portion of the dissolved solid is precipitated, yielding precipitated solid and lean solvent.

The lean solvent is passed in concurrent flow and in admixture with the antisolvent to cause precipitation of more solid from the solvent. All of the precipitated solid is passed (by the action of moving filtering members) through the zone counter-current to the antisolvent stream so the antisolvent can displace the solvent residue from the surface of the solid particles. This makes it easier to dry the solid particles, since the antisolvent will generally be more easily vaporized than the solvent and, further, is not conducive to particle stitcking and agglomeration as is the case of the solvent.

The invention, as well as its many advantages, will be understood by reference to the following detailed description and drawings in which.

Figure 1A:
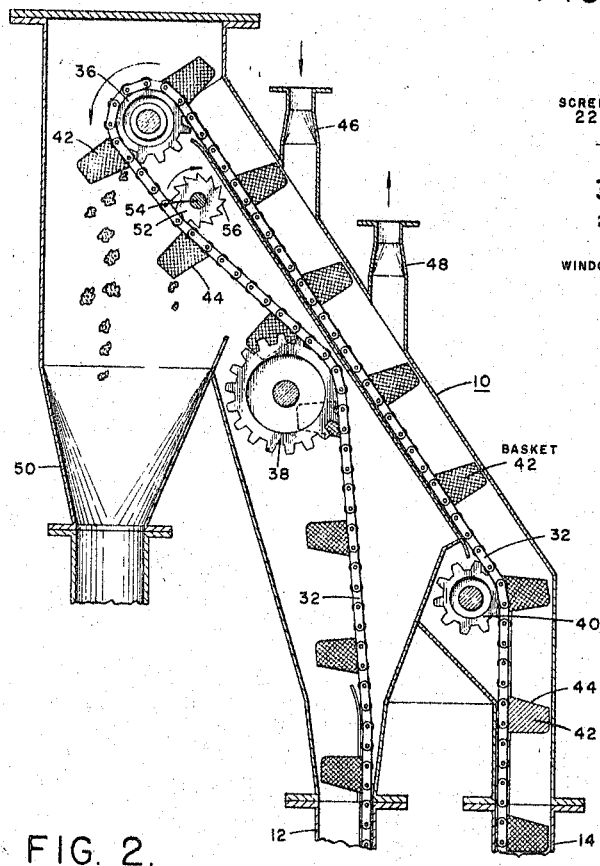
FIGS. 1A and 1B are sectional elevational views of the new apparatus.
Figure 1B:
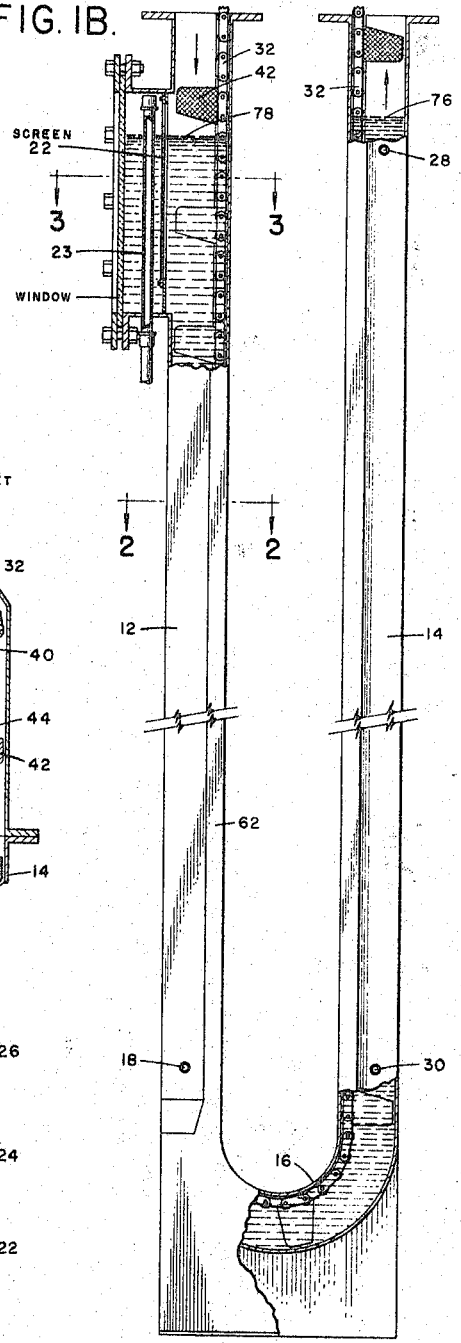

Referring specifically to FIGS. 1A and 1B, the polymer recovery apparatus includes a unit generally indicated by the numeral 10 into which the slurry containing both dissolved and suspended polymer in a solvent is added, the dissolved polymer precipitated, and the precipitated polymer washed and dried and then dropped out of the unit 10. The unit 10 includes a substantially U-shaped bottom portion including a first vertical leg 12 and a second vertical leg 14. Vertical legs 12 and 14 are interconnected by the rounded portion 16.

Figure 4:
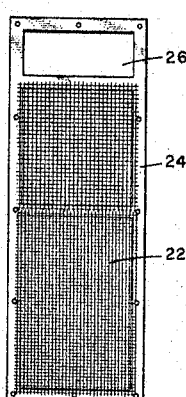
FIG. 4 is a detailed view of the fluid outlet and screen covering the outlet of the polymer recovery unit.

Leg 12 is provided with an inlet 18. The slurry is added to the leg 12 through inlet 18. An overflow outlet 20 is provided above the inlet 18. A screen material 22 is mounted within a frame member 24 (see FIG. 4) with the top portion 26 completely open.

Leg 14 is provided with an antisolvent inlet 28 for the introduction of a liquid, such as alcohol, to be used to precipitate the polymer. A second inlet 30 is provided in the leg 14 below inlet 28 so that if desired, more solvent, such as xylene, can be introduced into the system to improve washing.

A pair of endless sprocket chains 32 and 34 (see FIG. 1 and FIG. 2) is arranged to extend from sprocket mechanism 36 downwardly to sprocket mechanism 38, then downwardly through leg 12, around rounded portion 16, upwardly through leg 14, around sprocket mechanism 40, and back to the sprocket mechanism 36.

A plurality of filtering members 42 is mounted in spaced relation on the endless chains 32 and 34. The filtering members 42 are mounted so that the open top 44 of each filtering member faces upwardly as the filtering member is moved upwardly within leg 14. However, the open top 44 of each filtering member 42 faces downwardly as the filtering member is moved downwardly through leg 12 sweeping the polymer out of the upward flowing solvent. The filtering members 42, shown as baskets in the drawings, may be made of screen, perforated metal, or any other filtering media including polar or magnetic materials.

The baskets 42 extend outwardly from the chain to a point just adjacent the inside perimeter of the legs 12 and 14. With this construction, any polymer which has been precipitated in leg 12 and has escaped the baskets sweeping downwardly in leg 12 and which collects on the screen 22 adjacent the fluid outlet 20 is scraped off by the baskets as they pass the screen. A perforated pipe 23 is also provided to backwash the filter screen if necessary (see FIG. 3).

A drying fluid inlet 46 is located on one side of the top portion of the recovery unit and a drying fluid outlet 48 is located on the top portion of the recovery unit. Drying fluid inlet 46 and drying fluid outlet 48 are disposed so that polymer drying fluid may be flowed in the upper portion of the unit 10 in a direction generally countercurrent to the direction of movement of the filtering baskets 42. The dried polymer is dumped from each successive basket 42 as it passes over the sprocket mechanism 36. The polymer is dumped through spout 50 to a further processing unit (not shown).

Any dried polymer adhering to the baskets 42 is removed from the baskets by means of a vibrating and agitating mechanism including a circular ratchet 52 which is rotated by means of the shaft 54 in the opposite direction to the movement of chains 32 and 34. As the teeth 56 of ratchet 52 contact the rollers of the chains 32 and 34, the rollers ride upwardly along the tapered surface of each tooth 56 and then fall off the top of the tooth downwardly along the vertical portion of the tooth. This causes the baskets to be vibrated and agitated to loosen and remove any sticking dried polymer.

Figures 2, 3:
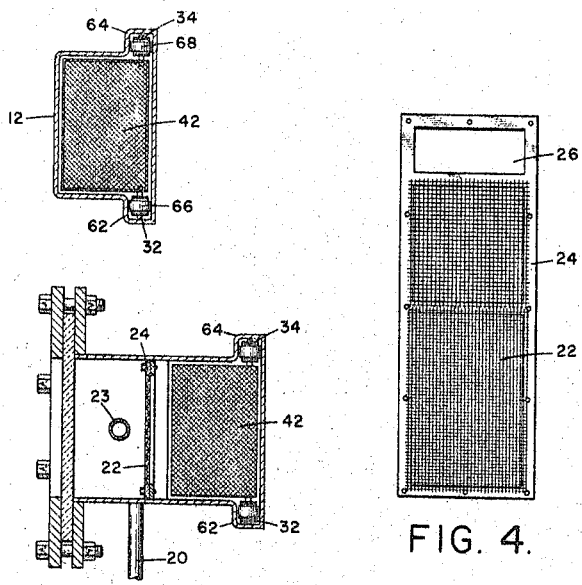
FIG. 2 is a view taken along line 2—2 of FIG. 1B.
FIG. 3 is a view taken along line 3—3 of FIG. 1B.

As shown in FIG. 2, the side portions of the leg 12 are formed to provide chain roller guides 62 and 64 for the rollers 66 and 68 of the chains 32 and 34, respectively. Similar guides are provided in the leg 14.

Figure 6:
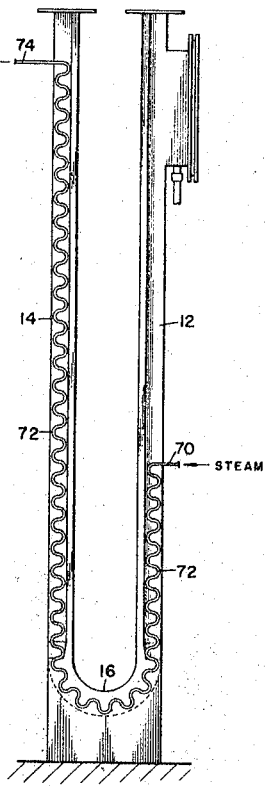
FIG. 6 is an elevational view showing one means for controlling the temperature of the fluid contained in the U-shaped portion of the unit.

The temperature of the materials in the U-shaped member is controlled by means of a continuous steam line (FIG. 6). The steam line includes a steam inlet 70 and a continuous steam tube 72 running downwardly along leg 12, around rounded portion 16, and upwardly along leg 14 to the top of leg 14 and then out the steam outlet 74.

In carrying out my new process for recovering solid polymer particles from a slurry containing both dissolved and suspended polymer in a diluent, a polymer precipitating, antisolvent fluid is added to the U-shaped tube through inlet 28. The U-shaped tube is substantially filled with liquid with the height of the liquid 76 in leg 14 being maintained higher than the height 78 of the liquid in leg 12. The precipitating liquid is continuously added at a rate sufficient to overcome the differential pressure across the baskets 42 so that a flow of fluid is maintained countercurrent to the movement of the baskets 42.

The slurry is continuously added to the leg 12 through inlet 18. As the slurry comes into contact with the precipitating agent, additional polymer is precipitated. The precipitation takes place adjacent and just below the slurry inlet 18. A suitable diluent is xylene. Other diluents suitable for the purpose are benzene, toluene, heptane, and pentane.

The molecular weight and amount of polymer precipitated are controlled by the ratio of alcohol to xylene located just adjacent the slurry inlet 18. The more alcohol, the more low molecular weight material will be precipitated. The volume of alcohol may range from 2 to 50 percent with the remainder of the liquid being xylene. If a slurry containing a high percentage of polymer is introduced into the unit, additional diluent can be added through diluent inlet 30 to improve the washing or flow of liquid.

The molecular weight and amount of polymer precipitated are also functions of the temperature of the liquid just adjacent the slurry inlet 18. The higher the temperature, the less low molecular weight polymer will be precipiated. In general, the temperature adjacent inlet 18 should be maintained between 110° F. to 140° F., while the temperature in the precipitation zone in general may suitably range from 100° F. to 140° F. The temperature is controlled by means of the steam line 72.

As the baskets 42 move downwardly past the inlet 18, the precipiated polymer is swept along in the baskets. The countercurrently flowing fluids in the U-shaped member perform a washing and agitating action on the polymer in the baskets. After the precipitated polymer has been collected in each basket, the basket moves around portion 16 and upwardly within leg 14.

The diluent inlet 30 is located sufficiently far below the precipitating agent inlet 28 so that the liquid above the inlet 30 is substantially all alcohol. This provides the advantage that alcohol is much more easily dried from the polymer than xylene and most diluents.

After each successive basket 42 moves upwardly from leg 14 and into the top portion of the unit 10, it is continuously contacted by the polymer drying gas flowing into the unit through inlet 46 and out of the unit from outlet 48. This flow is countercurrent to the direction of movement of the baskets 42. Suitable drying gases include nitrogen, methane, and ethane.

The dried recovered polymer is dumped from each basket as it moves around the top of sprocket mechanism 36 and out of the spout 50. Any polymer clinging to the basket is removed by vibration and agitation by means of the ratchet 52.

Figure 5:
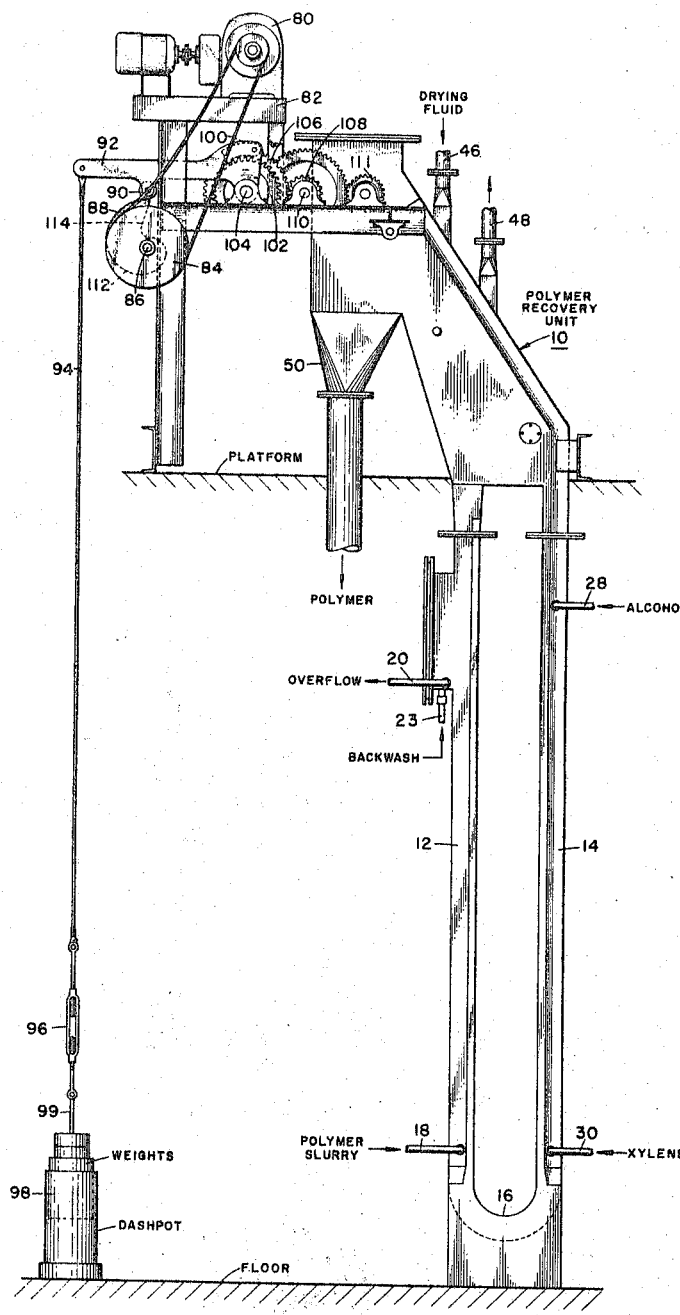
FIG. 5 is an elevational view showing the mechanism for moving the sprocket chain in the polymer recovery unit in sudden jerks.

The chains 32 and 34 may be moved continuously. However, more intimate contact of liquid with polymer for washing the polymer is obtained if the chains are moved in jerky movements. This may be accomplished by the mechanism shown in FIG. 5. As shown in FIG. 5, a motor 80 on support 82 drives a gear 84 and shaft 86 on which gear 84 is mounted. A cam 88 is also mounted on the shaft 86 and driven thereby. A cam roller 90 is attached to a lever 92. The outer end of lever 92 is connected to a wire rope 94 which in turn is connected to a turnbuckle 96. The turnbuckle 96 is attached to a dashpot 98 through shaft 99.

A pawl 100 is pivotally connected to the lever 92. The pawl 100 is adapted to engage the teeth of a ratchet wheel 102 mounted on the shaft 104. A second gear 106 is also mounted about the shaft 104. Gear 106 engages gear 108 mounted about shaft 110. Gear 108 drives the gear 111 of sprocket mechanism 36.

As the cam 88 rotates, the cam roller 90 rides along the cam surface 112 and then falls downwardly along the vertical surface 114 of cam 88. This downward movement pivots the lever 92 so that the pawl 100 engages the teeth of ratchet wheel 102 and rotates shaft 104 a predetermined amount. This rotation results in a movement of the sprocket mechanism 36 and the chains connected thereto.

As the cam roller 90 again rides along cam surface 112, the pawl 100 slides back along the teeth of the ratchet wheel in preparation for the next jerky movement of the cam mechanism.

As can be seen from the above discussion, the process of the present invention is adapted for use in precipitating polyolefins such as polypropylene, polyethylene, polyisobutylene, and butyl rubber from a solvent such as a $C_1$ to $C_{10}$ normal or isoalcohol, benzene, a $C_7$ to $C_9$ methylated aromatic hydrocarbon, a $C_6$ to $C_8$ cycloparaffin, or a $C_5$ to $C_8$ normal or isoparaffin, utilizing as an antisolvent a member chosen from the group consisting of ketones, $C_1$ to $C_{10}$ normal and isoalcohols, and water.

The conditions under which the precipitation is to be carried out may include an antisolvent-to-solvent ratio within the ratio of 1:10 to 1:1 by volume. A portion of the antisolvent may be admixed with the polyolefin-containing liquid stream before the polyolefin stream is introduced into the precipitation zone by way of slurry inlet 18. The polyolefin containing liquid stream will contain from 1 to 30 weight percent total solids.

Preferably, the temperature within the precipitation zone is within the range from 100° F. to 140° F., and the residence time of the polyolefin-containing liquid stream in the precipitation zone is from 30 seconds to 30 minutes.

As an illustration of what can be accomplished with the present process, following is a typical example wherein polypropylene was precipitated from solution in xylene, utilizing alcohol as a countersolvent.

TYPICAL EXAMPLE
[Polymer type: Polypropylene, temperature 125° F.]

| | Pounds Per Hour | Molecular Weight |
|---|---|---|
| Feed (Slurry Charge) | 500.0 | |
| Xylene | 450.0 | |
| Precipitated Polymer | 32.5 | 400,000 |
| Polymer in Solution | 17.5 | |
| Alcohol Added,[1] 94+150= | 244.0 | |
| Additional Polymer Precipitated | 14.5 | 92,000 |
| Polymer Remaining In Solution | 3.0 | |
| Recovered Polymer | 47.0 | 305,000 |

[1] This gives 75% xylene and 25% alcohol for precipitation plus 2 pounds of alcohol carried out with each pound of polymer. The alcohol was methanol.

I claim:
1. A process which comprises
   in an elongated precipitation zone having an antisolvent inlet end and a fluid outlet end
   continuously introducing a liquid stream of an antisolvent into said antisolvent inlet end of said zone,
   continuously passing said antisolvent stream through said zone,
   introducing a liquid stream containing a solvent and a dissolved solid into said zone at a point intermediate said antisolvent inlet end and said fluid outlet end of said zone,
   whereby a portion of said dissolved solid is precipitated from said liquid stream, yielding precipitated solid and lean solvent,
   passing said lean solvent in concurrent flow and in admixture with said antisolvent stream to said fluid outlet end of said zone, whereby further precipitated solid will be obtained,
   passing all of said precipitated solid through said zone countercurrent to said antisolvent stream whereby any residual solvent is displaced from said precipitated solid by said antisolvent,
   and recovering said solid from said zone.
2. A process in accordance with claim 1 wherein a por- tion of said antisolvent is admixed with said solid-containing liquid stream before introduction of said solid-containing liquid stream into said zone.

3. A process which comprises
in an elongated precipitation zone having an antisolvent inlet end and a fluid outlet end
continuously introducing a liquid stream of an antisolvent into said antisolvent inlet end of said zone,
continuously passing said antisolvent stream through said zone,
introducing a liquid stream containing a dissolved polyolefin into said zone at a point intermediate said antisolvent inlet end and said fluid outlet end,
whereby a portion of the dissolved polyolefin is precipitated from said slury, yielding precipitated solid polyolefin and lean solvent,
passing said lean solvent in concurrent flow and in admixture with said antisolvent stream to said fluid outlet, whereby further solid polyolefin will be precipitated,
passing all of said precipitated solid polyolefin through said zone countercurent to said antisolvent stream whereby any residual solvent is displaced from said polyolefin by said antisolvent,
and discharging all of said solid polyolefin from said zone adjacent said alcohol inlet end.

4. A process in accordance with claim 3 wherein a portion of said antisolvent is admixed with said polyolefin-containing liquid stream before introduction into said zone.

5. A process in accordance with claim 3 wherein the polyolefin is chosen from the group consisting of polyethylene, polypropylene, polyisobutylene, and butyl rubber.

6. A process in accordance with claim 3 wherein the solvent is a $C_1$ to $C_{10}$ normal or isoalcohol, benzene, a $C_7$ to $C_9$ methylated aromatic hydrocarbon, a $C_6$ to $C_8$ cycloparaffin, or a $C_5$ to $C_8$ normal or isoparaffin.

7. A process in accordance with claim 3 wherein the total solids in said polyolefin-containing liquid stream constitutes from 1 to 30 weight percent thereof.

8. A process in accordance with claim 3 wherein the antisolvent is chosen from the group consisting of ketones, $C_1$ to $C_{10}$ normal and isoalcohols, and water.

9. A process in accordance with claim 3 wherein the antisolvent to solvent ratio is from 1:10 to 1:1 by volume.

10. A process in accordance with claim 3 wherein the temperature within the precipitation zone is from 100° F. to 140° F.

11. A process in accordance with claim 3 wherein the residence time of the polyolefin-containing liquid stream in said precipitation zone is 30 seconds to 30 minutes.

12. A process which comprises
in an elongated precipitation zone having antisolvent inlet end and a fluid outlet end,
continuously introducing a liquid stream of an antisolvent into said antisolvent inlet end of said zone,
continuously passing said antisolvent stream through said zone and discharging said antisolvent from said fluid outlet end of said zone,
introducing a slurry of polyolefin and a solvent, which slurry contains both dissolved polyolefins and solid polyolefins, into said zone at a point intermediate said antisolvent inlet end and said fluid outlet end,
whereby a portion of the dissolved polyolefin is precipitated from said slurry, yielding additional solid polyolefin and lean solvent,
passing said lean solvent in concurent flow and in admixture with said antisolvent stream to said fluid outlet, whereby further solid polyolefin will be precipitated,
passing all of said polyolefin through said zone countercurrent to said antisolvent stream whereby any residual solvent is displaced from said polyolefin by said antisolvent,
and discharging all of said solid polyolefin from said zone adjacent said antisolvent inlet end,
wherein said polyolefin is chosen from the group consisting of polypropylene, polyethylene, polyisobutylene, and butyl rubber,
the solvent is chosen from the group consisting of a $C_1$ to $C_{10}$ normal or isoalcohol, benzene, a $C_7$ to $C_9$ methylated aromatic hydrocarbon, a $C_6$ to $C_8$ cycloparaffin, or a $C_5$ to $C_8$ normal or isoparaffin,
and wherein the antisolvent is chosen from the group consisting of ketones, $C_1$ to $C_{10}$ normal and isoalcohols, and water.

13. A process in accordance with claim 12 wherein a portion of said antisolvent is admixed with said polyolefin slurry before introduction of said slurry into said zone.

14. A process in accordance with claim 12 wherein the antisolvent to solvent ratio is from 1:10 to 1:1 by volume.

15. A process in accordance with claim 12 wherein the temperature is from 100° F. to 140° F.

16. In a process in accordance with claim 12 wherein the residence time of the polyolefin slurry in said zone is from 30 seconds to 30 minutes.

17. A process which comprises
in an elongated precipitation zone having an antisolvent inlet end and a fluid outlet end,
continuously introducing a liquid stream of a $C_1$ to $C_{10}$ normal or isoalcohol into said antisolvent inlet end of said zone,
continuously passing said alcohol stream through said zone and discharging said alcohol from said fluid outlet end of said zone,
introducing a slurry of a polyolefin in a xylene solvent, which slurry contains from 1 to 30 weight percent total solids, at least a portion of which is dissolved in said solvent, into said zone at a point intermediate said alcohol inlet and said fluid outlet,
whereby a portion of the dissolved polyolefin is precipitated from said slurry, yielding additional solid polyolefin and lean solvent,
passing said lean solvent in concurrent flow and in admixture with said alcohol stream to said fluid outlet, whereby further solid polyolefin will be precipitated,
passing all solid polyolefin through said zone countercurrent to said alcohol stream whereby any residual solvent is displaced from said polyolefin by said antisolvent,
and removing all of said solid polyolefin from said zone adjacent said alcohol inlet end.

18. A method in accordance with claim 17 wherein the temperature within the precipitation zone is from 100° F. to 140° F.

19. A process in accordance with claim 17 wherein the residence time of the polyolefin slurry in said zone is from 30 seconds to 30 minutes.

20. A process in accordance with claim 17 wherein the alcohol-to-xylene ratio is from 1:10 to 1:1 by volume.

21. A process which comprises
in an elongated precipitation zone having an alcohol inlet end and a fluid outlet end,
continuously introducing a liquid stream of a $C_1$ to $C_{10}$ normal or isoalcohol into said alcohol inlet end of said zone,
continuously passing said alcohol stream through said zone and discharging said alcohol from said fluid outlet end of said zone,
introducing a slurry of polypropylene and xylene, which contains from 1 to 30 weight percent total polypropylene, into said zone at a point intermediate said alcohol inlet end and said fluid outlet end, said slurry containing both dissolved and solid polypropylene,
whereby a portion of the dissolved polypropylene is precipitated from said slurry, yielding additional solid polypropylene and lean xylene, passing said lean xylene in concurrent flow and in admixture with said alcohol stream to said fluid outlet, whereby further solid polypropylene will be precipitated, passing all solid polyolefin through said zone countercurrent to said alcohol stream whereby any residual xylene is displaced from said polypropylene by said antisolvent, and removing said solid polyolefin from said zone adjacent said alcohol inlet end.

22. A process in accordance with claim 21 wherein the alcohol-to-xylene ratio is from 1:10 to 1:1 by volume.

23. A process in accordance with claim 21 wherein the temperature is from 100° F. to 140° F.

24. A process in accordance with claim 21 wherein the residence time of the polypropylene slurry in said zone is from 30 seconds to 30 minutes.

25. A process which comprises in an elongated precipitation zone having a methanol inlet end and a fluid outlet end, continuously introducing a liquid stream of methanol into said methanol inlet end of said zone, continuously passing said methanol through said zone and discharging said methanol from said fluid outlet end of said zone, introducing a slurry of polypropylene in said xylene containing from 1 to 30 weight percent total polypropylene, and containing both solid and dissolved polyproplene, into said zone at a point intermediate said methanol inlet and said fluid outlet end, whereby a portion of the dissolved polyolefin is precipitated from said slurry, yielding additional solid polypropylene and lean xylene, passing said lean xylene in concurrent flow with said methanol stream to said fluid outlet, whereby further solid polyproylene will be precipitated, passing all of said solid polyolefin through said zone countercurrent said methanol stream whereby any residual solvent is displaced from said polypropylene by said methanol, and removing said solid polypropylene from said zone adjacent said alcohol inlet end.

26. In an elongated precipitation zone having an alcohol inlet end and a fluid outlet end, the process which comprises continuously introducing a liquid stream of an alcohol chosen from the group consisting of methanol and isopropanol into said alcohol inlet end of said zone, passing said alcohol stream through said zone and discharging said alcohol from said fluid outlet end of said zone, introducing a slurry of polyolefin and a xylene solvent which contains both dissolved polyolefin and precipitated polyolefin into said zone at a point intermediate said alcohol inlet end and said fluid outlet end, whereby a portion of the dissolved polyolefin is precipitated from said slurry, yielding additional solid polyolefin and lean solvent, passing said lean solvent in concurrent flow with said alcohol stream to said fluid outlet, whereby further solid polyolefin will be precipitated, passing all solid polyolefin through said zone countercurrent to said alcohol stream and said lean solvent whereby any residual solvent is displaced from said solid polyolefin by said alcohol, and removing said solid polyolefin from said zone adjacent said alcohol inlet end.

27. A process in accordance with claim 26 wherein the polyolefin is polypropylene and the alcohol is methanol.

28. A process in accordance with claim 26 wherein the temperature within said zone adjacent the slurry inlet is maintained within the range from 110° F. to 140° F.

29. A process in accordance with claim 26 further comprising the step of drying said solid polyolefin by contact with a drying fluid after removal of said polyolefin from said zone.

30. A process in accordance with claim 29 wherein the polyolefin is polypropylene and the alcohol is methanol.

31. A process in accordance with claim 30 wherein the temperature adjacent the slurry inlet is maintained at 110° F. to 140° F.

References Cited

UNITED STATES PATENTS

| | | | |
|---|---|---|---|
| 3,058,971 | 10/1962 | Miller | 260—94.9 |
| 3,074,921 | 1/1963 | Carter | 260—93.7 |
| 3,198,777 | 8/1965 | Van den Berg | 260—94.9 |

OTHER REFERENCES

Brown: "Unit Operations," pp. 279–280, 1955, John Wiley & Sons.

McCabe: "Unit Operations of Chemical Engineering," pp. 757–758, 1956, McGraw-Hill.

Perry: "Chemical Engineer's Handbook," pp. 927–930, 3rd ed., McGraw-Hill, 1950.

JOSEPH L. SCHOFER, *Primary Examiner.*

F. L. DENSON, *Assistant Examiner.*